July 19, 1955 R. N. RHODES 2,713,607

COLOR TELEVISION TRANSMISSION SYSTEMS

Filed May 25, 1953

3 Sheets-Sheet 1

INVENTOR.
Roland N. Rhodes

BY [signature]

ATTORNEY

INVENTOR.
Roland N. Rhodes
BY
ATTORNEY

INVENTOR.
Roland N. Rhodes
BY Otis A. Mitchell
ATTORNEY

United States Patent Office 2,713,607

Patented July 19, 1955

2,713,607

COLOR TELEVISION TRANSMISSION SYSTEMS

Roland N. Rhodes, New Brunswick, N. J., assignor to Radio Corporation of America, a corporation of Delaware Application May 25, 1953, Serial No. 356,986

6 Claims. (Cl. 178—5.4)

The present invention relates to an improved color television transmission system, and more particularly to an improved method and apparatus for generating color television signals.

One method of transmitting color television signals contemplates the transmission of a brightness signal in substantially the same manner as is conventionally employed for black and white television transmission. In addition, a color subcarrier wave spaced from the main carrier wave by a frequency substantially equal to an odd multiple of one half the line scanning frequency may be employed to carry the chromaticity information. Such a color subcarrier wave may be provided by amplitude modulating each of a plurality of different phases of a carrier wave with color signal information and adding the resultant amplitude modulated waves to produce a phase and amplitude modulated wave suitable for transmission as a color subcarrier wave or as a separate carrier wave.

At a color television receiver, the chromaticity information carried by the different phases of the color subcarrier wave may be obtained by comparison of the color subcarrier wave with a locally generated fixed frequency wave which is synchronized with a corresponding wave at the color television transmitter by a suitable color synchronizing signal. In the case where it is desired to modulate two phases of a wave bearing a phase quadrature relationship one to the other, it will be appreciated that the information carried by each phase may be derived separately without crosstalk or interference from the information carried by the quadrature phase providing no distortion of the color subcarrier wave appears within the transmission medium. A discussion of this type of color television system may be found in an article entitled "Principles of NTSC compatible color television" appearing at page 88 of "Electronics" for February 1952.

In order to reduce interference between a color subcarrier wave and a main carrier wave, it is customary to choose a frequency for the color subcarrier wave near the edge of the video passband of the system. Sometimes a portion of one sideband may extend beyond the allotted channel bandwidth and be lost in transmission. Where a portion of one sideband is lost in transmission, distortion is introduced which results in crosstalk between the separate color signals. One method for overcoming this distortion is to average it out on succeeding lines of a television raster. Since the United States standards call for an interlaced system of scanning, either the order of color selection, the phase of one of the quadrature components, or the actual sidebands themselves may be reversed every other television field, thereby resulting in the average of two adjacent traces of the television raster being substantially correct. This process has been termed color phase alternation, and a description of it may be found in the United States patent application, Serial No. 220,622, filed on April 12, 1951, by G. C. Sziklai et al., entitled "Multiplex Signalling System."

In previous tentative standards of the National Television System Committee, each of two quadrature phases of a subcarrier wave was modulated with a color difference signal representing a primary color signal minus a brightness signal. In this system, the bandwidth of each of the color signals was identical. Where a subcarrier wave is transmitted over a medium wherein both sidebands of the color subcarrier are available at a receiver, it has been found that distortion or crosstalk in this region is negligible. Therefore, it was proposed that one of the color signals be limited in bandwidth to frequencies resulting in sideband frequencies in the double sideband region. Thus, no crosstalk appears between the two signals for frequencies exceeding the double sideband region since only one signal is transmitted in this so-called single sideband region. This results in a two color image reproduction for signal frequencies outside the double sideband region, and a three color image reproduction for signal frequencies within the double sideband region. This mode of transmission is described in detail in a copending U. S. patent application of David G. C. Luck, entitled "Color Television," Serial No. 223,021, filed April 26, 1951. One system described by Luck contemplates that the blue color difference signal be limited in bandwidth since the eye is less sensitive to blue light than to red or green light. Thus, in such a system, the two color reproduction for high frequencies is made up of red and green. Another system described by Luck contemplates that a red color difference signal be transmitted in both the double sideband region and the single sideband region while a narrow band color signal is transmitted in the double sideband region only. The narrow band color signal is limited in bandwidth to frequencies which cause sidebands in the double sideband regions of the color subcarrier wave only, and represents blue and green. It has been found that limiting the bandwidth of one of the color signals in accordance with the teachings of the aforementioned patent application of D. G. C. Luck results in an improved color television system.

According to the Field Test Standards for color television transmission adopted by the National Television System Committee on February 2, 1953, and in accordance with some of the principles taught in the copending application of Luck referred to above, it is contemplated that the color subcarrier wave be modulated by two signals sometimes referred to as the "I" signal and the "Q" signal. The "I" signal is a wideband color signal representing selected portions of three primary colors, which when taken in combination with the brightness signal provides two color information suitable for reproduction of a color television image along a two color gamut between the color orange and the color cyan. The selection of the orange-cyan color gamut was made after exhaustive studies on the acuity of the human eye for resolving small area information. Since the eye is more sensitive to small area information along a gamut between orange and cyan than for other combinations of colors, these colors were chosen for a suitable two color signal. For low signal frequencies where the color subcarrier wave is transmitted by means of both sidebands, the "Q" signal, which represents selected portions of signals representing the three primary colors so as to provide three color information when taken in combination with the brightness signal and the "I" signal, modulates the other phase of the color subcarrier wave. In such a system, narrow band signals representing color difference signals, may be derived directly from the color subcarrier wave without reference to the "I" and "Q" signals. However, this information must necessarily be limited to the bandwidth of the "Q" signal since spurious information resulting from crosstalk occurs for signal frequencies in excess of the highest frequency transmitted in the double sideband region of the color subcarrier wave.

The phases of the color subcarrier wave modulated by the "I" and "Q" signals bear a quadrature phase relationship one to the other. In addition, the proportions of the primary colors chosen to make up the "I" and "Q" signals are such that the component of the color subcarrier wave representing the red color difference signal lags the "I" signal component by 33°. In like manner, the component of the color subcarrier wave representing the blue color difference signal lags the "Q" signal component by 33°. Also, the color synchronizing signal or "burst" is chosen to be 180° out of phase with respect to the blue color difference signal component. This means that the burst leads the "I" signal component by an angle of 57°. It will be appreciated that this angular differential between the "I" signal component and the color synchronizing signal is more difficult to obtain than a 180° phase relationship.

Therefore, it is an object of the present invention to generate suitable signals for transmission by means of separate phases of a color subcarrier wave other than the previously mentioned phases modulated by the aforementioned "I" signal component and the "Q" signal component, whereby a color subcarrier wave is provided which is identical to a color subcarrier wave which is modulated directly by an "I" signal component and a "Q" signal component.

In previous color television systems, it was contemplated that two quadrature phased components of a color subcarrier wave be modulated with color difference signals representing a primary color minus the brightness signal. One such system contemplated a red color difference signal modulating one phase of a color subcarrier wave, and a blue color difference signal modulating a quadrature phased component of a color subcarrier wave. Some of this equipment has been constructed, and has operated very satisfactorily.

Therefore, it is an additional object of the present invention to provide apparatus for adapting a quadrature phased color subcarrier wave modulating system in which the color synchronizing signal is 180° out of phase with respect to one of the quadrature phases to provide a resultant color subcarrier wave which contains two quadrature phased components displaced from said first quadrature phased components by an angle of 33°, these last named quadrature phased components bearing signal information representative of the aforementioned "I" and "Q" signals.

According to this invention, a color subcarrier wave is provided by generating a first color signal which when taken in combination with a brightness signal provides two color information, generating a second color signal which when taken in combination with the first color signal and the brightness signal provides three color information, by combining the first color signal and the second color signal to form a first color difference signal representing a primary color signal minus the brightness signal, by combining the first color signal and the second color signal to form a second color difference signal representing another primary color signal minus the brightness signal, amplitude modulating a given phase of a subcarrier wave by the first color difference signal, amplitude modulating a quadrature phased wave of subcarrier frequency by the second color difference signal, and by combining the amplitude modulated waves of subcarrier frequency to form a phase and amplitude modulated color subcarrier wave.

Other and incidental objects of this invention will become apparent upon a reading of the following specification and an inspection of the drawings in which.

Figures 1, 3A:
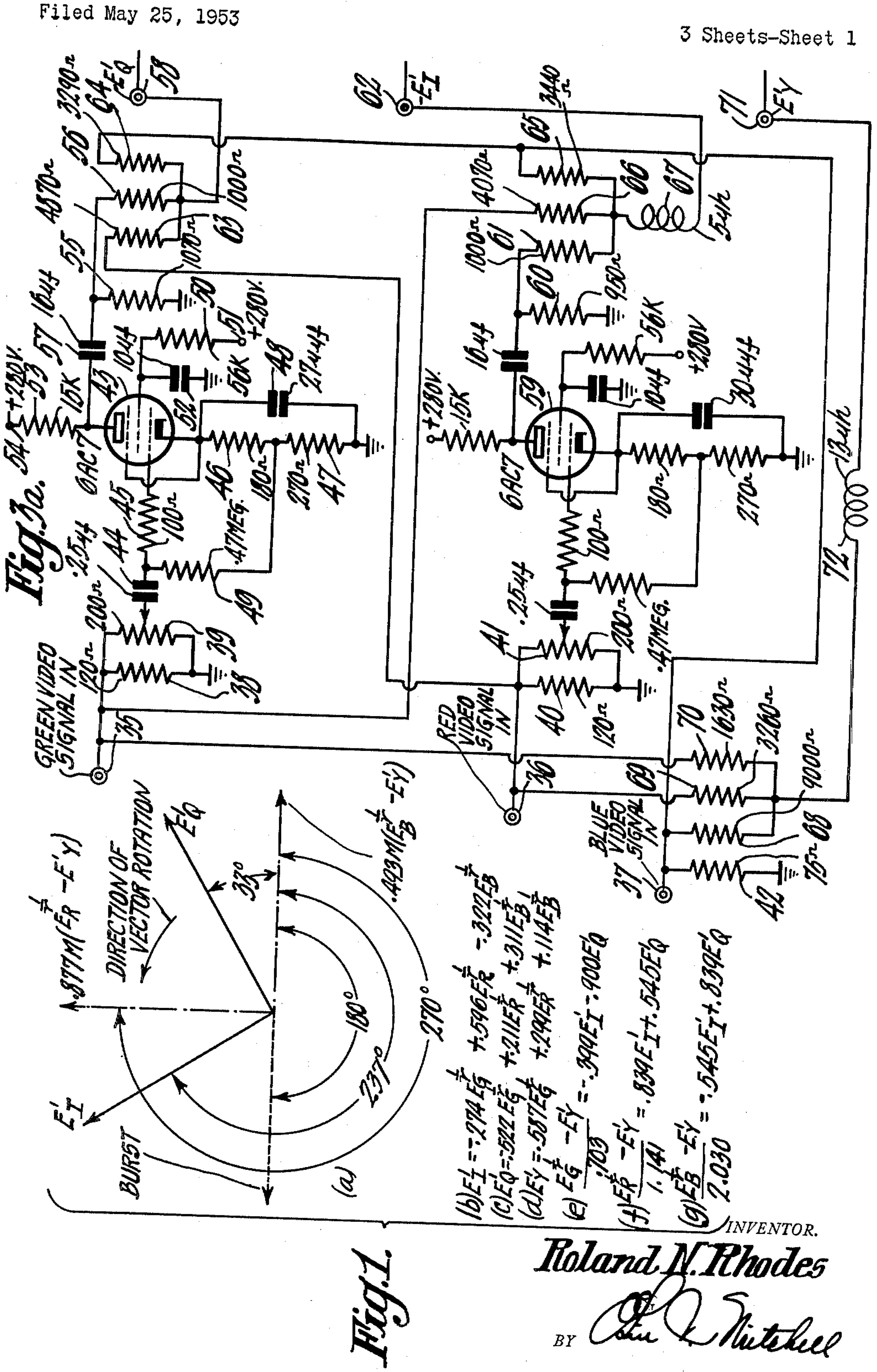
Figure 1 is a vector diagram and equations included for the purpose of explaining the operation of a proposed color television system.

Part (*a*) of Figure 1 shows a vector diagram illustrating the relationships of certain of the components of a color subcarrier wave transmitted in accordance with the field test standards approved by the National Television System Committee on February 2, 1953. Thus, a vector designated $E'_I$ and a vector designated $E'_Q$ bear a quadrature phased relationship one to the other. Equation (*b*) of Figure 1 gives one suitable set of proportions for deriving the $E'_I$ signal from signals representing each of three primary colors. In like manner, equation (*c*) gives the proportions of the primary color signals which may be combined to provide $E'_Q$ signal. The proportions of the three primary color signals appearing in the brightness signal $E'_Y$ is given by the equation (*d*) of Figure 1. As was previously noted, the $E'_I$ signal and the brightness signal provide two color information along a color gamut between the color orange and the color cyan, and the $E'_Q$ signal, when taken in combination with the $E'_I$ signal and the brightness signal, provides three color information. The bandwidth of the $E'_Q$ signal may be limited to those frequencies corresponding to the region in which the color subcarrier wave is transmitted by means of both sidebands and crosstalk between the signals is negligible. Thus, for low frequency color information the $E'_I$ signal and the $E'_Q$ and $E'_Y$ signals provide three color information, while for signal components of higher frequency the $E'_I$ signal and the $E'_Y$ signal provide two color information along a color gamut between the color orange and the color cyan. This means that color edges in a color television image will be reproduced in two colors, i. e., orange and cyan. It will be apparent from equations (*e*), (*f*), and (*g*) that color difference signals representing a primary signal minus a brightness signal may be derived by combining suitable proportions of the $E'_I$ signal and the $E'_Q$ signal. This has been done vectorially in the case of the red color difference signal and the blue color difference signal in the vector diagram of part (*a*) of Figure 1. Thus, the vertical dash-dot line represents a given proportion of the red color difference signal, while the horizontal dash-dot line is a vector representing a given proportion of the blue color difference signal. It will be noted that the color synchronizing signal or burst bears a 180° phase relationship with respect to the blue color difference signal. In considering the actual color subcarrier wave which is transmitted, it will be apparent that at any given instant in time the color subcarrier wave may be represented by a single vector. This single vector is the vector sum or resultant of the $E'_I$ vector and the $E'_Q$ vector. Since a single vector may be resolved into vector components along any desired pair of axes, it will be apparent that a single vector which is a resultant of the $E'_I$ vector and the $E'_Q$ vector might be resolved into components on the axes indicated by the red color difference signal and the blue color difference signal. Therefore, such a resultant signal may be provided either by transmitting the $E'_I$ and the $E'_Q$ signals by means of suitable phases of a color subcarrier wave or by transmitting chosen signals on phases of a color subcarrier wave represented vectorially by the red color difference signal and the blue color difference signal to provide a color subcarrier wave identical to that which is provided by transmitting the $E'_I$ signal and the $E'_Q$ signal on quadrature phases of a color subcarrier wave directly.

Figure 2:
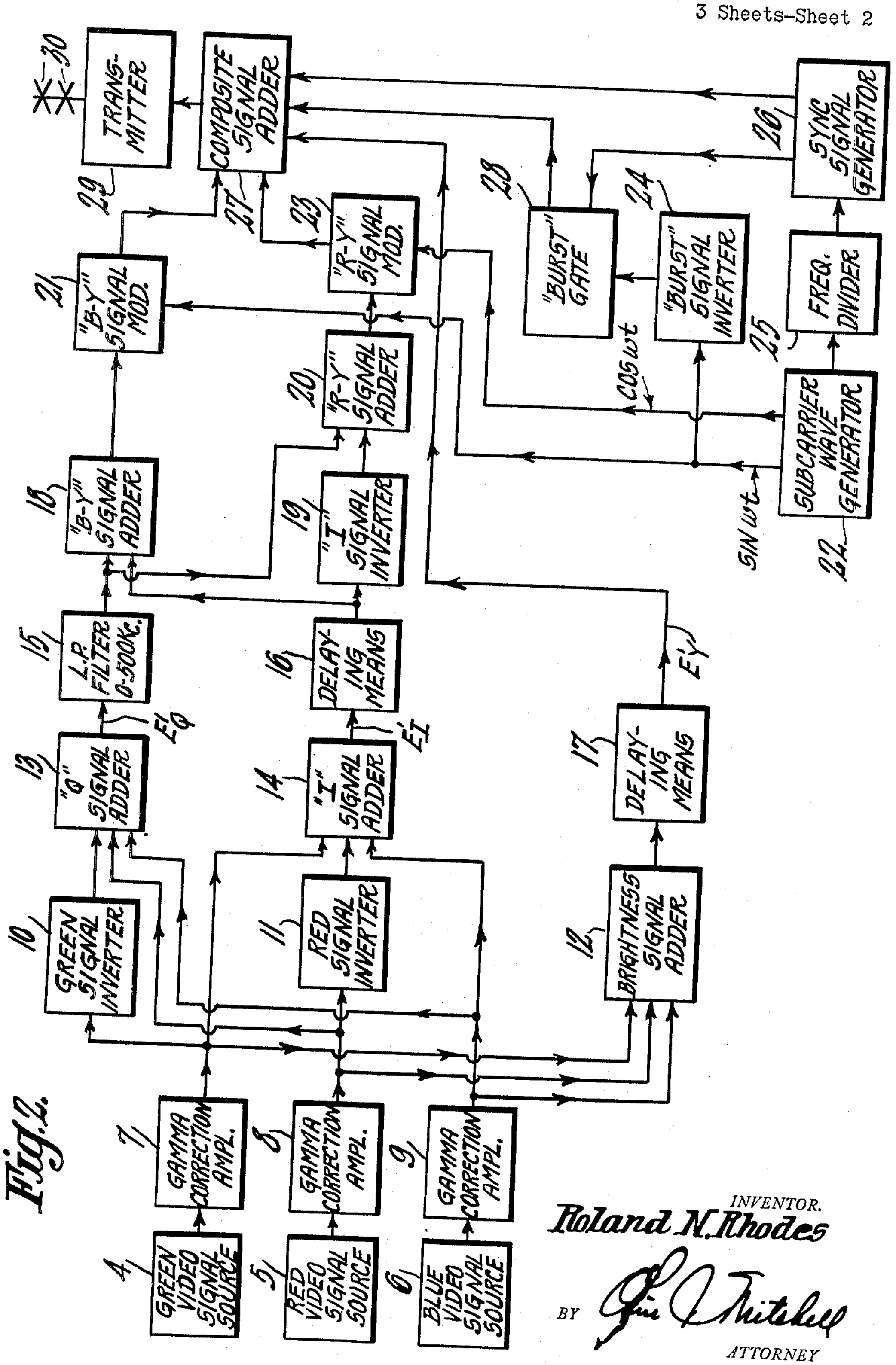
Figure 2 is a block diagram of a color television transmission system including an illustrative embodiment of the present invention.

Referring in detail to Figure 2, video signals representing three chosen primary colors, for example, green, red, and blue are provided by a green video signal source 4, a red video signal source 5, and a blue video signal source 6 respectively. Each of these signal sources 4, 5, and 6 might comprise a conventional black and white television camera having a suitable optical filter associated therewith for limiting the response of the color television camera to a selected primary color. Each of the video signals representing a primary color is then passed through an amplifier 7, 8, and 9, which functions to gamma correct the primary color signals to compensate for inherent nonlinearities in the over-all transmission system. This process is similar to that employed in black and white television systems where gamma correction is frequently employed to compensate for the nonlinear characteristic of a reproducing device. In the field test standards proposed by the National Television System Committee on February 2, 1953 gamma is given a value of 2.75. However, other values of gamma may be employed without departing from the present invention.

The amplified gamma corrected green video signal appearing in the output of the amplifier 7 is reversed in polarity by the green signal inverter 10. In like manner, the amplified red gamma corrected video signal from the amplifier 8 is reversed in polarity by the red signal inverter 11. The brightness signal adder 12 combines selected portions of the amplified gamma corrected green, red, and blue video signals to provide a suitable brightness signal. One set of proportions for a suitable brightness signal is given by equation (*d*) of Figure 1. Thus, approximately 59% of the green video signal, approximately 30% of the red video signal, and approximately 11% of the blue video signal are combined to give a suitable brightness signal. The "Q" signal adder 13 combines proportions of the negative green video signal appearing at the output of the green signal inverter 10 with proportions of the red video signal and the blue video signal. One suitable set of proportions for the $E'_Q$ signal are given by equation (*c*) of Figure 1, wherein approximately 52% of the negative green video signal, approximately 21% of the red video signal, and approximately 31% of the blue video signal are combined to provide a suitable $E'_Q$ signal. The "I" signal adder 14 provides a negative $E'_I$ signal at its output. Changing the signs occurring in equation (*b*) of Figure 1 shows that such a negative $E'_I$ signal may be provided by adding approximately 27% of a positive green video signal, approximately 60% of a negative red video signal, and approximately 32% of a blue video signal. As previously noted, the proportions given for the $E'_I$ signal, the $E'_Q$ signal, and the brightness signal ($E_Y$) are such that the $E'_I$ signal, when taken in combination with the brightness signal, provides two color reproduction, and the $E'_Q$ signal, when taken in combination with the brightness signal and the $E'_I$ signal, provides three color reproduction. This is analogous to the mathematical concept of solving two equations for two unknowns and three equations for three unknowns. Thus, two color information may be obtained by combining the $E'_I$ signal with the brightness signal while three color information may be obtained from the $E'_Q$ signal in combination with the brightness signal and the $E'_I$ signal. A low pass filter 15 limits the "Q" signal appearing at the output of the "Q" signal adder 13 to frequencies corresponding to the double sideband region. In accordance with the aforementioned field test standards, the low pass filter 15 may have a nominal passband from zero to 500 kc. Since a low pass filter delays the passage of a signal, a suitable delaying means 16 is connected to the "I" signal adder 14 while a suitable delaying means 17 is connected to the brightness signal adder 12. Thus, the delaying means 16 and 17 delay the $E'_I$ signal and the brightness signal so as to maintain the time relationship between the $E'_Q$ signal, the $E'_I$ signal, and the brightness signal. The B–Y signal adder 18 combines suitable proportions of the $E'_Q$ signal and the negative $E'_I$ signal to provide a color difference signal representing a blue primary color minus the brightnesss signal. Equation (*g*) of Figure 1 gives one suitable set of proportions in which a negative $E'_I$ signal and an $E'_Q$ signal may be combined to provide a suitable B–Y signal. The $E'_I$ signal inverter 19 inverts the negative $E'_I$ signal to provide a positive $E'_I$ signal. The R–Y signal adder 20 combines the positive $E'_I$ signal and the $E'_Q$ signal in suitable proportions to provide a red color difference signal. One set of suitable proportions is given in equation (*f*) of Figure 1.

It is assumed that the B–Y signal adder 18 and the R–Y signal adder 20 include suitable attenuating or amplifying means to provide desired relationships between the signals and the brightness signal. These relationships are indicated for a gain of unity in the brightness signal channel by the figures in the denominators of equations (*f*) and (*g*) of Figure 1.

Let us consider for a moment exactly what signals appear at the output of the B–Y signal adder 18 and the R–Y signal adder 20. Where the signal frequencies are within the passband of the low pass filter 15 and correspond to signal frequencies producing sidebands in the double sideband region of a color subcarrier wave, the output of the B–Y signal adder 18 is a blue color difference signal representing a blue primary color minus the brightness signal. In like manner, the output of the R–Y signal adder 20 is a red color difference signal representing a red primary signal minus the brightness signal. These two signals, when taken in combination with the brightness signal, provide information for three color reproduction of a color television image. However, for signal frequency outside the passband of low pass filter 15 corresponding to signals in the signal sideband region in which a color subcarrier wave is transmitted, the $E'_Q$ signal disappears and the output of the B–Y signal adder 18 represents a selected portion of the negative $E'_I$ signal while the output of the R–Y signal adder 20 represents a selected portion of the positive $E'_I$ signal. Thus, the signal information appearing at the output of the B–Y signal adder 18 and the R–Y signal adder 20 when taken in combination with the brightness signal provides two color information. By suitably choosing the relationship between these signals, the two color information can be made to provide color information along a color gamut ranging between orange and cyan, as was previously described with respect to the $E'_I$ signal taken in combination with the brightness signal. Another feature of the signals appearing at the output of the B–Y signal adder 18 and the R–Y signal adder 20 is that these signals can be chosen so that when the signals are transmitted by means of quadrature phases of a color subcarrier wave, the resultant color subcarrier wave is identical to a color subcarrier wave having quadrature phased components modulated by the $E'_I$ and $E'_Q$ signals directly. In order to provide such a resultant color subcarrier wave, the signal appearing at the output of the B–Y signal adder 18 is applied to a B–Y signal modulator 21. A subcarrier wave generator 22 supplies to the B–Y signal modulator 21 a subcarrier wave equal to sine $\omega t$. The phase of this wave corresponds to that of horizontal dash-dot vector of the vector diagram (*a*) of Figure 1. Thus, an amplitude modulated signal appears at the output of the B–Y signal modulator 21 which may be represented by the dash-dot vector $$.493M\left(E_B^{\frac{1}{\lambda}}-E'_Y\right)$$

where M equals the modulation index. Thus, the length of the vector is determined by the amplitude of the signal appearing at the output of the B–Y signal adder 18. The subcarrier wave generator 22 is adapted to provide another wave of subcarrier frequency equal to cosine $\omega t$, bearing a phase quadrature relationship with respect to wave equal to sine $\omega t$. This wave equal to cosine $\omega t$ is of a phase indicated by the vertical dash-dot vector of part ($a$) of Figure 1. The R–Y signal modulator 23 modulates the wave of cosine $\omega t$ with the signal appearing at the output of R–Y signal adder 20. This amplitude modulated subcarrier wave signal is represented by the dash-dot vector of part ($a$) of Figure 1 designated $$.877M\left(E_R^{\frac{1}{\lambda}}-E_Y'\right)$$

where M equals the modulation index. Thus, it is seen that two quadrature phased components of a subcarrier wave are provided each of which is amplitude modulated by a signal which, if chosen in accordance with the principles of this invention, provides a resultant color subcarrier wave identical to that produced where an $E'_I$ signal and an $E'_Q$ signal modulate quadrature phases of a color subcarrier wave displaced 33° from the axis of the subcarrier wave supplied by the subcarrier wave generator 22.

It will be noted that the phase of the color synchronizing signal or burst is indicated by the dashed vector which is 180° out of phase with the vector designated $$.493M\left(E_B^{\frac{1}{\lambda}}-E_Y'\right)$$

It will be appreciated that a 180° phase relationship of a color synchronizing signal is more easily provided and maintained than the relationship between the color synchronizing signal and the $E'_I$ and $E'_Q$ signal components of a color subcarrier wave. Thus, a color synchronizing signal may be provided by means of a simple burst signal inverter 24 which functions to reverse the polarity of the subcarrier wave equal to sine $\omega t$, thereby providing a wave 180° out of phase with respect to the signal appearing at the output of the B–Y signal modulator 21. In order to maintain the aforementioned relationship between the frequency of the subcarrier wave and the horizontal line scanning frequency, a frequency divider 25 is connected between a conventional synchronizing signal generator 26 and the subcarrier wave generator 22. Thus, the frequency of the subcarrier wave may be maintained at an odd multiple of one half the line frequency. The synchronizing signal generator 26 applies a conventional composite television synchronizing signal to the composite signal adder 27 and suitable gating pulses to the burst gate 28 for the purpose of energizing the gate so as to allow a few cycles of the subcarrier wave appearing at the burst signal inverter 24 to pass to the composite signal adder 27 succeeding each horizontal synchronizing pulse. As is well known, this positions the color synchronizing signal or burst on the region of the composite color television synchronizing signal commonly known as the "backporch." A discussion of the color synchronizing signal may be found in an article entitled "NTSC color-TV synchronizing signal," by R. B. Dome at page 96 of "Electronics" for February 1952. The composite signal adder 27 functions to add the signal appearing at the B–Y signal modulator 21, the signal appearing at the R–Y signal modulator 23 to provide a phase and amplitude subcarrier wave which is indistinguishable from that produced when an "I" signal and a "Q" signal modulate quadrature phase components of a color subcarrier wave. This phase and amplitude modulated color subcarrier wave is added to the brightness signal from the delaying means 17, the color synchronizing signal from the burst gate 28, and the composite television synchronizing signal from the synchronizing signal generator 26. Thus, a composite color television signal is provided which may be applied to a conventional television transmitter 29 wherein a main carrier wave is modulated with the composite color television signal and radiated by an antenna 30.

Figure 3($a$) shows a schematic circuit diagram of apparatus for performing the functions of the green signal inverter 10, the red signal inverter 11, the "Q" signal adder 13, the "I" signal adder 14, and the brightness signal adder 12. The green video signal may be applied to a terminal 35, the red video signal may be applied to a terminal 36, and the blue video signal may be applied to a terminal 37.

The green video signal appears across the parallel combination of a resistance 38 and a potentiometer 39 which in combination provides a suitable terminating resistance for a coaxial cable such as may be employed for green video signal transfer to the terminal 35. In like manner, the red video signal appears across a resistance 40 and a potentiometer 41 which in combination provides a terminating resistance. A resistance 42, across which the blue video signal appears, provides a suitable termination for the blue video signal transfer cable.

By adjusting the tap on the potentiometer 39, the amount of green video signal appearing at the control electrode of an electron tube 43 via a coupling capacitance 44 and a resistance 45 may be varied. Electron tube 43 with its associated circuitry functions to invert the green video signal so as to provide a negative green video signal. Electron tube 43 is self biased by means of resistances 46 and 47 and a capacitance 48. The combination of serially connected resistances 46 and 47 and the capacitance 48 provide a degenerative effect to increase the stability of the circuitry.

In order to establish a proper biasing potential, a conventional grid leak resistance 49 is connected between the control electrode of electron tube 43 and the serial connection between resistances 46 and 47. A suitably positive operating potential may be applied to the screen grid of electron tube 43 by means of a screen grid resistance 50 and a terminal 51. The screen grid bypass capacitance 52 maintains the screen grid of electron tube 43 at A.-C. ground reference potential, and the suppressor grid of electron tube 43 may be connected to the cathode as shown. A suitable positive operating potential may be applied to the anode of electron tube 43 by means of a load resistance 53 and a terminal 54.

The inverted green video signal appearing across load resistance 53 is coupled across a resistance 55 and a resistance 56 by means of a coupling capacitance 57. Thus, by suitably choosing the values of resistance 55 and resistance 56 a selected portion of the negative green video signal appears at terminal 58. In like manner, a desired portion of the red video signal appearing across potentiometer 41 is applied to the control electrode of electron tube 59 where the red video signal is inverted and coupled across a resistance 60 and a resistance 61. By suitably proportioning the resistances 60 and 61, a selected portion of the negative red video signal appears at terminal 62.

The red video signal applied to terminal 36 also appears across a resistance 63 which if suitably chosen provides a selected portion of the red video signal at the terminal 58. In like manner, a selected portion of the blue video signal applied to terminal 37 appears across a resistance 64 and a resistance 65, while a portion of the green video signal appears across a resistance 66. Thus, by suitably choosing the values of resistances 56, 63, and 64 a signal is provided at the terminal 58 which represents selected portions of the red video signal, the blue video signal, and the negative green video signal. These values may be chosen in accordance with the values given in equation ($c$) of Figure 1 to provide an $E'_Q$ signal at terminal 58.

The signal appearing at the terminal 62 representing selected portions of the green video signal, the negative red video signal, and the blue video signal may be taken as the $E'_I$ signal where the values of resistances 61, 65, and 66 are suitably chosen to provide the proportions given in equation (b) of Figure 1. The inductance 67 functions to match the impedance of a coaxial cable connected to terminal 62 for time delaying purposes to be discussed in a later portion of the specification.

Resistances 68, 69, and 70 function to combine at terminal 71 suitable proportions of the red, the blue, and the green video signals to provide a brightness signal, the proportions of which may be chosen in accordance with equation (d) of Figure 1. An inductance 72 functions to match the impedance of a cable connected to terminal 71 for time delaying means to be discussed presently.

Thus, a brightness signal, a negative $E'_I$ signal, and an $E'_Q$ signal may be generated by means of the circuitry of Figure 3(a) in accordance with the field test standards of the National Television System Committee of February 2, 1953. However, the operation of the apparatus of Figure 3(a) is not limited to the particular proportions of signals given by equations (c), (d), and (e) of Figure 1. Other proportions of the primary color signals might be chosen by suitable selection of the circuit values.

Figure 3B:
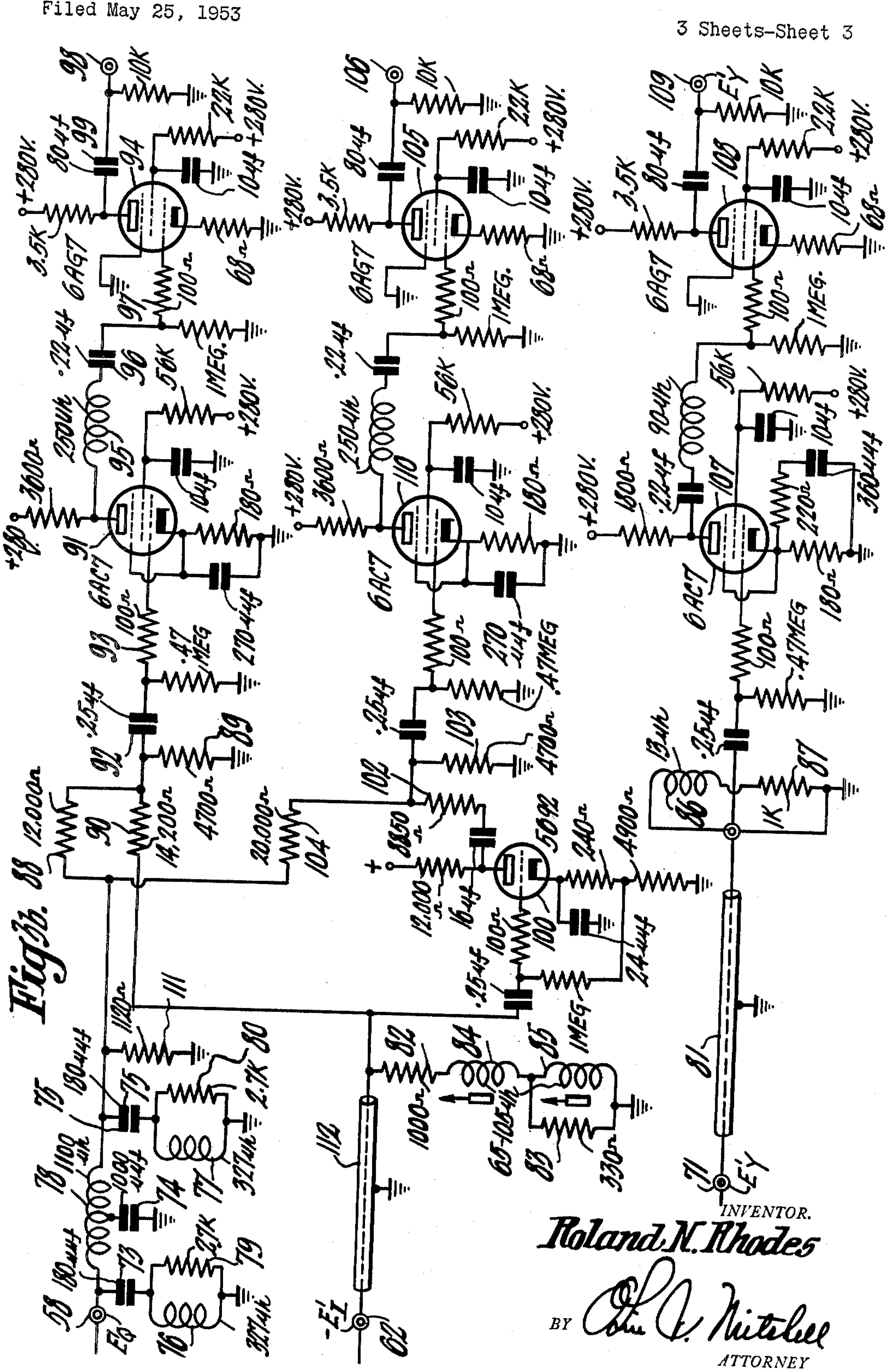
Figures 3(*a*) and 3(*b*) are schematic circuit diagrams of apparatus suitable for performing certain of the functions indicated in the block diagram of Figure 2.

Figure 3(b) is a continuation of the schematic circuit diagram of Figure 3(a) and to clearly indicate the circuit connections between the schematic circuit diagram of Figure 3(b) and Figure 3(a) terminals 58, 62, and 71 have been repeated in Figure 3(b).

Capacitances 73, 74, and 75, inductances 76, 77, and 78, resistances 79 and 80, in combination, provide a low pass filter corresponding to the low pass filter 15 of Figure 2. Although the low pass filter may have any suitable cutoff characteristic, the circuit values indicated provide a passband from zero to nominally 500 kc. in accordance with the field test standards of the National Television System Committee. Thus, the bandwidth restricted $E'_Q$ signal appears across a resistance 111. A delay line 112 and a delay line 81 connected to terminals 62 and 71 respectively provide a suitable time delay for the negative $E'_I$ signal and the brightness signal to compensate for the time delay introduced in the $E'_Q$ signal channel by the low pass filter 15. The exact length of delay line required should be chosen to correspond to the particular low pass filter utilized. Where a delay line having a time delay of approximately .04 microseconds per foot is employed, a delay line length of from 33½ to 35 ft. has been found to be satisfactory.

The delay line 112 is terminated in its characteristic impedance by means of a resistance 82, a resistance 83, and inductances 84 and 85 which provide a high frequency peaking action to compensate for high frequency attenuation of a signal by the delay line.

The delay line 81 is terminated in its characteristic impedance by means of an inductance 86 and a resistance 87. A portion of the $E'_Q$ signal appears across a voltage divider comprising a resistance 88 and a resistance 89. By suitable selection of the values of resistances 88 and 89, a desired portion of the $E'_Q$ signal appears across resistance 89. In like manner, the negative $E'_I$ signal appears across a resistance 90 and the resistance 89. Thus, selected portions of the $E'_Q$ signal and the negative $E'_I$ signal appear across the resistance 89 and are coupled to the control electrode of an electron tube 91 via a coupling capacitance 92 and a resistance 93.

Reference to equation (g) of Figure 1 shows that selected portions of the $E'_Q$ signal and the negative $E'_I$ signal may be combined to provide a blue color difference signal. Electron tube 91 and its associated circuitry function to amplify this blue color difference signal in accordance with well known principles. Thus, an amplified blue color difference signal available at the anode of electron tube 91 is coupled to the control electrode of an electron tube 94 via a peaking inductance 95, a coupling capacitance 96, and a resistance 97. Electron tube 94 and its associated circuitry provide additional amplification for the blue color difference signal which is coupled from the anode of electron tube 94 to a terminal 98 by means of a coupling capacitance 99. Thus, an amplified blue color difference signal is available at terminal 98 which is suitable for application to the B–Y signal modulator 21 of Figure 2.

Electron tube 100 and its associated circuitry function to invert the negative $E'_I$ signal to provide a positive $E'_I$ signal across a voltage divider comprising resistance 102 and resistance 103. The $E'_Q$ signal appears across a resistance 104 and the resistance 103. By suitable selection of the values of resistance 102, resistance 103 and electron tube 104 desired portions of the positive $E'_I$ signal and the $E'_Q$ signal may be combined.

Reference to equation (f) of Figure 1 shows that a red color difference signal may be provided by combining selected portions of the positive $E'_I$ and $E'_Q$ signals. The red color difference signal is amplified by electron tubes 110 and 105 and their associated circuitry to provide an amplified red color difference signal at terminal 106. The brightness signal is amplified by electron tubes 107 and 108 and their associated circuitry to provide an amplified brightness signal at terminal 109. The amplified brightness signal may be applied to the composite signal adder 27 of Figure 2, and the amplified red color difference signal may be applied to the R–Y signal modulator 23 of Figure 2. Thus, it is seen that the schematic circuit diagrams of Figure 3(a) and Figure 3(b) provide apparatus for the functions indicated by the green signal inverter 10, the red signal inverter 11, the "Q" signal adder 13, and the "I" signal adder 14, the brightness signal adder 12, the low pass filter 15, the delaying means 16, the delaying means 17, the B–Y signal adder 18, the "I" signal inverter 19, the R–Y signal adder 20 along with suitable amplifiers not shown in Figure 2.

Circuit values given on the schematic diagram of Figures 3(a) and 3(b) are as follows: for resistances, in ohms; for inductances, in microhenries (μH); and for capacitances in micromicrofarads (μμfd.) and microfarads (μfd.) as noted. It is to be understood that these values are merely exemplary and although indicative of those which have been employed in apparatus which has operated successfully, others might well be selected for a particular application of the present invention.

Although the principles of the present invention and the illustrative embodiment have been described with reference to the field test standards set by the National Television System Committee on February 2, 1953, it will be appreciated that the principles of the invention may be used to advantage for other methods of color television transmission without departing from the spirit of the invention.

What is claimed is:

1. In a color television system for conveying chromaticity information by means of a color subcarrier wave having phased components and brightness information by means of a main carrier wave, means for generating a phase and amplitude modulated color subcarrier wave and a brightness signal, including the combination of, a source of red color signals, a source of blue color signals, a source of green color signals, a first signal adding means coupled to said red, said blue, and said green color sources for providing a brightness signal, a second signal adding means coupled to said red, said blue, and said green color sources for providing a signal which when taken in combination with said brightness signal provides two color information along a color gamut between the color orange and the color cyan, a third signal adding means coupled to said red, said blue, and said green signal sources for providing a second color signal which when taken in combination with said brightness signal and said second color signal provides three color information within a color triangle the apices of which are the primary colors represented by the red, the blue, and the green color signals, frequency limiting means coupled to said third signal adding means, a fourth signal adding means coupled to said frequency limiting means and said second signal adding means for providing a first color difference signal, a fifth signal adding means coupled to said frequency limiting means and said third signal adding means for providing a second color difference signal, a source of waves of a first given phase and of subcarrier frequency, modulating means coupled between said fourth signal adding means and said source of subcarrier waves to provide a subcarrier wave of a first given phase which is amplitude modulated in accordance with said first color difference signal, a source of subcarrier waves having a second given phase, a second modulating means coupled between said fifth signal adding means and said subcarrier wave of second given phase for providing a quadrature phased subcarrier wave which is amplitude modulated in accordance with said second color difference signal, and a sixth signal adding means coupled to said first modulating means, said second modulating means, and said first signal adding means whereby a composite signal is produced comprising said phase and amplitude modulated color subcarrier wave and a brightness signal.

2. In a color television transmission system for transmitting a composite color television signal including a brightness signal and a phase and amplitude modulated color subcarrier wave having phased components, means for generating said phase and amplitude modulated color subcarrier wave, including the combination of, a source of signals representing a first primary color, a source of signals representing a second primary color, a source of signals representing a third primary color, means coupled to each of said signal sources for combining selected portions of said primary color signals to provide a first color signal which when taken in combination with said brightness signal provides two color information along a color gamut between the color orange and the color cyan, means coupled to each of said signal sources for combining selected portions of said primary color signals to provide a second color signal which when taken in combination with said first color signal and said brightness signal provides three color information within a color triangle the apices of which are the primary colors represented by said primary color signals, frequency limiting means coupled to said second combining means for limiting the signal components of said second color signal to frequencies up to and including a desired frequency, a first signal adding means coupled to said first combining means and said frequency limiting means for combining selected portions of said first color signal and said frequency limited second color signal to provide a color difference signal representing one of said primary color signals minus said brightness signal, a second signal adding means coupled to said first signal combining means and said frequency limiting means to combine selected portions of said first color signal and said frequency limited second color signal to provide a second color difference signal representing another of said primary color signals minus said brightness signal, a first modulating means coupled to said first signal adder for modulating a wave of a first given phase and subcarrier frequency with said first color difference signal, a second modulating means coupled to said second signal adding means for modulating a wave of subcarrier frequency and of a second given phase with said second color signal, and a third signal adding means coupled to said first modulating means and said second modulating means for combining said modulated signals to provide said phase and amplitude modulated color subcarrier wave.

3. In a color television system for conveying chromaticity information by means of a color subcarrier wave transmitted over a transmission medium having a region in which both sidebands of said subcarrier wave are transmitted and having a region in which only one sideband of said subcarrier wave is transmitted, means for generating a phase and amplitude modulated subcarrier wave comprising, the combination of, a source of red color signals representing a red primary color, a source of blue color signals representing a blue primary color, and a source of green color signals representing a green primary color, a first signal adding means coupled to said red, said blue, and said green signal sources for providing a first color signal representing selected portions of each of said red, said blue, and said green color signals, a frequency limiting means coupled to said first adding means, for passing frequencies corresponding to said region in which said subcarrier wave is transmitted by means of both sidebands, a second signal adding means coupled to said red, said blue, and said green signal sources for providing a second color signal representing selected portions of said red, said blue, and said green color signals, a third signal adding means coupled to said frequency limiting means and said second signal adding means for combining said first color signal and said second color signal to provide a first color difference signal and a second color difference signal, a first modulating means coupled to said third signal adding means, a source of waves of a first given phase coupled to said first modulating means whereby a wave of subcarrier frequency amplitude modulated in accordance with said frequency limited first color signal is provided, a second modulating means coupled to said third signal adding means, a source of waves of a second given phase coupled to said second modulating means whereby a wave amplitude modulated in accordance with said second color signal is provided, and a fourth signal adding means coupled to said first signal modulating means and said second signal modulating means whereby a said phase and amplitude modulated subcarrier wave is provided.

4. In a color television transmission system for conveying chromaticity information by means of a color subcarrier wave and brightness information by means of a main carrier wave, means for generating a phase and amplitude modulated color subcarrier wave comprising the combination of, a source of red color signals, a source of blue color signals, and a source of green color signals, a red signal inverter coupled to said red signal source for reversing the polarity of said red signal, a green signal inverter coupled to said green signal source for reversing the polarity of said green color signals, an "I" signal adder coupled to said green signal source, said red signal inverter, and said blue signal source for providing a first color signal which when taken in combination with said brightness signal provides two color information along a color gamut ranging between the color orange and the color cyan, a "Q" signal adder coupled to said green signal inverter, said red signal source, and said blue signal source for providing a second color signal which when taken in combination with said brightness signal and said first color signal provides three color information within a color triangle with the apices of which are the green, the red, and the blue primary colors represented by said primary color signals, a low pass filter coupled to said "Q" signal adder for limiting the frequency components of said second color signal to frequencies up to and including a given frequency, a B–Y signal adder coupled to said "Q" low pass filter and said "I" signal adder for providing a blue color difference signal, an "I" signal inverter coupled to said "I" signal adder for reversing the polarity of said first color signal, an R–Y signal adder coupled to said low pass filter and said "I" signal inverter for providing a red color difference signal, a B–Y signal modulator coupled to said B–Y signal adder, a source of waves of given phase and of subcarrier frequency coupled to said B–Y signal modulator whereby a wave of given phase and subcarrier frequency amplitude modulated by said blue color difference signal is provided, an R–Y signal modulator coupled to said R–Y signal adder, a source of quadrature phased waves of subcarrier frequency coupled to said R–Y signal modulator whereby a quadrature phased subcarrier wave amplitude modulated by said red color difference signal is provided, and a composite signal adder coupled to said B–Y signal modulator and said R–Y signal modulator for combining said amplitude modulated subcarrier waves to provide said phase and amplitude modulated color subcarrier wave.

5. In a color television transmission system for conveying chromaticity information by means of a color subcarrier wave and brightness information by means of a main subcarrier wave, means for generating a phase and amplitude modulated color subcarrier wave comprising the combination of, means generating a first color signal representing selected portions of three primary colors which when taken in combination with said brightness signal provides two color information along a color gamut between the color orange and the color cyan, means generating a second color signal representing selected portions of three primary colors which when taken in combination with said first color signal and said brightness signal provides three color information within a color triangle the apices of which represent said three primary colors, means limiting said second color signal to frequency components up to and including a desired frequency, means combining said first color signal and said second color signal to provide a blue color difference signal, means combining said first color signal and said second color signal to provide a red color difference signal, means modulating a wave of first given phase and subcarrier frequency with said blue color difference signal, means modulating a wave of subcarrier frequency and of a second given phase with said red color difference signal, and means combining said modulated wave of said first given phase and said modulated wave of said second given phase to provide a said phase and amplitude modulated color subcarrier wave.

6. In a color television transmission system for conveying chromaticity information by means of a color subcarrier wave and brightness information by means of a main subcarrier wave, means for generating a phase and amplitude modulated color subcarrier wave comprising in combination, means for generating a first color signal representing selected portions of three primary colors which when taken in combination with said brightness signal provides two-color information along a first predetermined two-color axis, means for generating a second color signal representing selected portions of three primary colors which when taken in combination with said brightness signal provides two-color information along a second predetermined two-color axis, means for limiting the frequency of said first color signal to frequency components up to and including a first desired frequency, means for limiting said second color signal to frequency components up to and including a second desired frequency, means for combining said first color signal and said second color signal to provide a first color-difference signal bearing a prescribed relationship to one of said three primary colors, means for combining said first color signal and said second color signal to provide a second color-difference signal bearing a prescribed relationship to a second of said three primary colors, a first subcarrier, said first subcarrier having a first prescribed phase, a second subcarrier having a second prescribed phase, means for modulating said first color-difference signal with said first subcarrier to produce a first component color modulated subcarrier, means for modulating said second color-difference signal with said second subcarrier to produce a second component color modulated subcarrier, and means for combining said first component color modulated subcarrier and said second component color modulated subcarrier to produce said phase and amplitude modulated color subcarrier waves.

UNITED STATES PATENTS

References Cited in the file of this patent 2,635,140 Dome ---------------- Apr. 14, 1953